(12) United States Patent
Odell

(10) Patent No.: US 7,133,301 B2
(45) Date of Patent: **\*Nov. 7, 2006**

(54) METHOD AND APPARATUS FOR BALANCING ACTIVE CAPACITOR LEAKAGE CURRENT

(75) Inventor: Arthur B. Odell, Cupertino, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/244,731

(22) Filed: Oct. 6, 2005

(65) Prior Publication Data

US 2006/0067096 A1 Mar. 30, 2006

Related U.S. Application Data

(63) Continuation of application No. 10/816,069, filed on Mar. 30, 2004, now Pat. No. 6,980,451, which is a continuation of application No. 10/287,746, filed on Nov. 4, 2002, now Pat. No. 6,738,277.

(60) Provisional application No. 60/335,234, filed on Nov. 30, 2001, provisional application No. 60/333,453, filed on Nov. 27, 2001.

(51) Int. Cl.
*H02M 7/04* (2006.01)

(52) U.S. Cl. .......................... 363/143; 363/52

(58) Field of Classification Search ................ 363/143, 363/142, 59, 60, 61, 52, 53
See application file for complete search history.

(56) References Cited

U.S. PATENT DOCUMENTS

| | | | |
|---|---|---|---|
| 2,956,172 A | 10/1960 | Torkildsen | |
| 3,174,095 A | 3/1965 | Cocker | |
| 3,456,129 A | 7/1969 | Burnett et al. | |
| 3,581,104 A | 5/1971 | Thew | |
| 3,810,026 A * | 5/1974 | Roth | 327/175 |
| 4,555,655 A | 11/1985 | Tanaka | |
| 4,555,751 A | 11/1985 | Koga et al. | |
| 4,568,871 A | 2/1986 | Bauman | |
| 4,783,729 A | 11/1988 | Konopka | |
| 5,063,340 A | 11/1991 | Kalenowsky | |
| 5,099,407 A | 3/1992 | Thorne | |
| 5,119,283 A | 6/1992 | Steigerwald et al. | |
| 5,422,562 A | 6/1995 | Mammano et al. | |
| 5,682,022 A | 10/1997 | Schröder-Brumloop et al. | |

(Continued)

FOREIGN PATENT DOCUMENTS

EP 0076599 A2 4/1983

(Continued)

*Primary Examiner*—Shawn Riley
(74) *Attorney, Agent, or Firm*—Blakely Sokoloff Taylor & Zafman, LLP

(57) ABSTRACT

A circuit that provides a method and apparatus to actively balance capacitor leakage current from series stacked capacitors and disconnects itself when stacked capacitors are configured for doubler operation. In one embodiment, the active circuit includes high voltage low current transistors, such as for example a PNP bipolar transistor and an NPN bipolar transistor, that are configured in a sink-source voltage follower arrangement with the bases of the transistors connected to a voltage divider network and referenced to a fraction of a DC input voltage with a very high impedance, low dissipative resistor divider network. In one embodiment, the emitters of the PNP and NPN transistors are both tied to the connection point between capacitors in the stack and provide an active sink-source drive, which maintains the voltage at this point to be bounded by the input reference voltages of sink-source followers.

16 Claims, 1 Drawing Sheet

U.S. PATENT DOCUMENTS 5,886,502 A    3/1999   Higashijima
5,963,439 A   10/1999   Wuidart et al.
6,738,277 B1   5/2004   Odell

FOREIGN PATENT DOCUMENTS

| | | |
|---|---|---|
| EP | 0443246 A2 | 8/1991 |
| EP | 02258114   | 1/2005 |
| FR | 2535539    | 5/1984 |
| FR | 2690538    | 10/1993 |
| JP | 05299940   | 11/1993 |
| JP | 10295081   | 11/1998 |
| JP | 2001218382 | 8/2001 |
| JP | 2001286173 | 10/2001 |

\* cited by examiner

METHOD AND APPARATUS FOR BALANCING ACTIVE CAPACITOR LEAKAGE CURRENT

REFERENCE TO PRIOR APPLICATIONS

This application is a continuation of U.S. application Ser. No. 10/816,069, filed Mar. 30, 2004, now U.S. Pat. No. 6,980,451, which is a continuation of U.S. application Ser. No. 10/287,746, filed Nov. 4, 2002, now issued as U.S. Pat. No. 6,738,277 B2, which claims the benefit of and claims priority to U.S. provisional application Ser. No. 60/333,453, filed Nov. 27, 2001, entitled "Method And Apparatus For Balancing Active Capacitor Leakage Current," and which also claims the benefit of and claims priority to U.S. provisional application Ser. No. 60/335,234, filed Nov. 30, 2001, entitled "Method And Apparatus For Balancing Active Capacitor Leakage Current."

BACKGROUND OF THE INVENTION

1. Field of the Invention

This invention relates generally to circuits and, more specifically, the present invention relates to circuits including series stacked capacitors.

2. Background Information

One function of a power converter is to convert rectified alternating current (AC) power into a regulated direct current (DC) output. FIG. 1 shows elements included at an input 103 to a power converter 101. Diode bridge BR1 105 rectifies AC input. Series stacked capacitors C1 107 and C2 109 are coupled across diode bridge BR1 105 to smooth the output voltage of diode bridge BR1 105. Series stacked capacitors are common in power supplies that can be configured to operate using multiple different input voltages such as for example either 115V AC or 230V AC. As shown, switch SW1 111 is coupled between diode bridge BR1 105 and the connection point 113 between series stacked capacitors C1 107 and C2 109. When operating for example at 230V AC, switch SW1 111 is opened. When operating for example at 115V AC, switch SW1 111 is closed.

Resistors R1 115 and R2 117 are coupled across series stacked capacitors C1 107 and C2 109 as shown to maintain roughly equal voltages across C1 107 and C2 109 and provide the necessary bleed current needed to balance the voltage across series stacked capacitors C1 107 and C2 109 when the supply is configured for 230V AC input. During 115V AC operation, the two series stacked capacitors C1 107 and C2 109 function as part of an input voltage doubler circuit. When configured for 230V AC, however, the two series stacked capacitors C1 107 and C2 109 have no DC connection to a center point voltage other than that which is provided by resistors R1 115 and R2 117. Without resistors R1 115 and R2 117, the center point voltage of the two series stacked capacitors C1 107 and C2 109 can deviate from the ideal ½ DC input due to capacitor leakage current, which can cause one capacitor to have more voltage stress than the other capacitor. In fact, it is possible that one of the capacitors can be over-voltage stressed and become damaged.

Resistors R1 115 and R2 117 therefore provide a solution to the balance problem by providing bleed current. The resistance values of R1 115 and R2 117 must be low enough to establish a bleed current that is several times higher than the worst case leakage current imbalance between the series stacked capacitors C1 107 and C2 109 in order to be effective. This requires the resistors to dissipate much more power than the actual power dissipated as a result the difference current between the two capacitors. Consequently, resistors R1 115 and R2 117 result in significant input power consumption with respect to many standby or output no-load requirements of a power supply converter coupled to receive the rectified AC power.

SUMMARY OF THE INVENTION

An active circuit that substantially reduces the bleed current required for balancing leakage current in series stacked capacitors is disclosed. This active circuit can also be designed to disconnect any bleed current when capacitors are configured for voltage doubler operation as bleed current is not necessary in this configuration. In one embodiment, the circuit is switched across a capacitor to provide bleed current as required to balance the leakage current. In one embodiment, the voltage at the connection point between two capacitors is bounded within a few volts of two reference voltages. In one embodiment, the bleed current is substantially equal to the difference in leakage current between two series stacked capacitors. In one embodiment, the active circuit includes a sink-source follower circuit. In one embodiment, a sink-source follower circuit includes inputs where each are referenced to voltages that are offset by a fraction of the voltage applied across the series stacked capacitors and the outputs of the sink-source follower circuits are coupled to the connection point between two series stacked capacitors. In one embodiment the offset is limited to a very low value and can be substantially zero. In one embodiment, the sink follower circuit includes a PNP bipolar transistor coupled to a source follower circuit, which includes an NPN bipolar transistor. In one embodiment, resistors are connected in series with the collector of each of the bipolar transistors to limit the peak current conducted by the bipolar transistors. In one embodiment, the active circuit is used in a power supply circuit In another embodiment, a method of substantially reducing the bleed current required for balancing leakage current in series stacked capacitors utilizing an active circuit is disclosed. In one embodiment, the bleed current required is switched in as required to balance leakage current from the series stacked capacitors. In one embodiment, the bleed current from the active circuit is switched off and is substantially equal to zero when series stacked capacitors are configured for doubler operation. In one embodiment, the bleed current is substantially equal to a difference in leakage currents between two capacitors. In one embodiment, the active circuit includes a means to maintain an output voltage, connected to the connection point between two series stacked capacitors, relative to an input reference voltage. In one embodiment, the disclosed method is applied in a power supply circuit. Additional features and benefits of the present invention will become apparent from the detailed description and figures set forth below.

BRIEF DESCRIPTION OF THE DRAWINGS

The present invention detailed illustrated by way of example and not limitation in the accompanying figures.

DETAILED DESCRIPTION

An embodiment of a circuit schematic that balances active capacitor leakage current is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As an overview, input power dissipation associated with the balancing of leakage current of series stacked capacitors is reduced according to an embodiment of the present invention. In one embodiment, a circuit according to the teachings of the present invention actively balances the voltage of series stacked capacitors using high voltage low current transistors, such as for example one PNP and one NPN bipolar transistor. In one embodiment, the transistors are configured in a sink-source voltage follower arrangement with the bases of these transistors tied to slightly different or offset reference voltages centered near ½ DC input voltage with a very high impedance, low dissipative resistor divider network which includes three resistors. The emitters of the two transistors are both tied to the connection point between series stacked capacitors and provide an active sink-source drive, which bounds the voltage at this point to be within input references.

Figure 2:
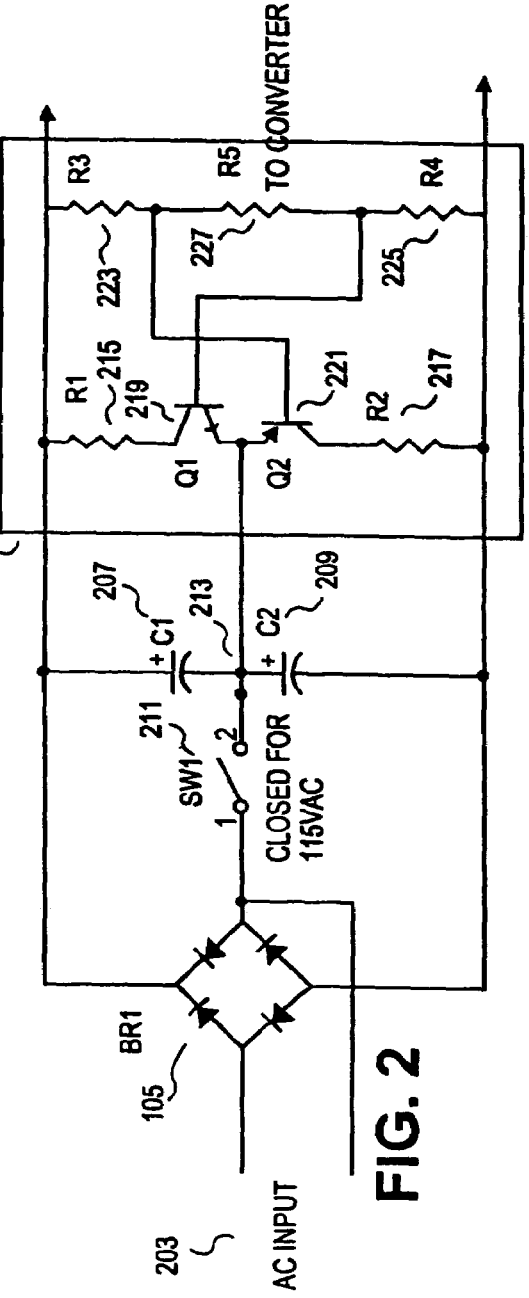
FIG. 2 shows one embodiment of a circuit schematic in which capacitor leakage current from series stacked capacitors is balanced in accordance with the teachings of the present invention.

To illustrate, FIG. 2 shows generally one embodiment of a circuit 201 according to the teachings of the present invention to actively balance the voltage of series stacked capacitors. In one embodiment, circuit 201 is a portion of a power converter or power supply that rectifies and smoothes a high voltage AC input. In the illustrated embodiment, circuit 201 is adapted to be compatible with multiple different input voltages for the power supply or converter such as for example but not limited to 230 V AC or 115 V AC. As shown in the depicted embodiment, diode bridge BR1 205 is coupled to rectify AC input 203 voltage and stacked capacitors C1 207 and C2 209 are coupled across diode bridge BR1 205 to smooth the rectified voltage. As shown, switch SW1 211 is coupled between diode bridge BR1 205 and the connection point 213 between series stacked capacitors C1 207 and C2 209. When operating for example at 230V AC, switch SW1 211 is opened. When operating for example at 115V AC, switch SW1 211 is closed to provide voltage doubling across the series combination of C1 207 and C2 209.

Figure 1:
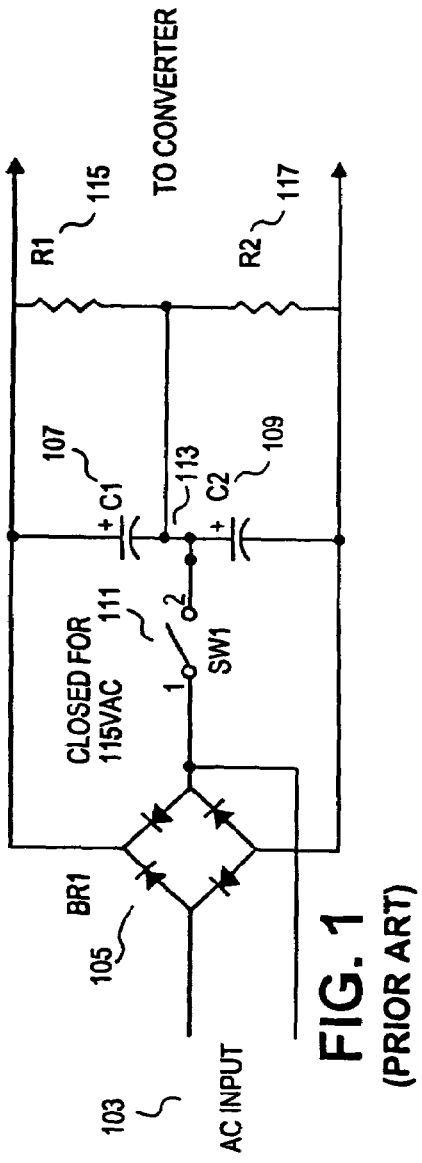
FIG. 1 shows a circuit schematic of a known technique to balance capacitor leakage current from series stacked capacitors.

As shown inside box 200 of FIG. 2, one embodiment of a sink-source voltage follower circuits are illustrated. The illustrated sink-source voltage follower circuits include a resistor R1 215, a bipolar NPN transistor Q1 219, a bipolar PNP transistor Q2 221 and a resistor R2 217 coupled in series across series stacked capacitors C1 207 and C2 209. The control terminals or bases of transistors Q1 219 and Q2 221 are connected through resistor R5 227 and are therefore biased to input reference voltages slightly offset from each other. In one embodiment, the degree of offset of the input reference voltages is provided with a resistor network and is governed by the choice of resistors R3 223, R4 225 and R5 227. When the switch SW1 211 is closed to provide voltage doubling across the series combination of C1 207 and C2 209, the offset introduced by resistor 227 allows transistors Q1 219 and Q2 221 to be effectively disconnected and prevent the circuit from trying to correct for true voltage differences in the voltages applied to capacitors 207 and 209 on subsequent AC half cycles. In one embodiment, resistor R5 may have a resistance substantially equal to zero, which limits the offset to a low or substantially zero value and has the effect of replacing R5 227 with a short circuit connection effectively connecting the bases of bipolar transistors Q1 219 and Q2 221 together. In one embodiment, the resistance values of resistors R3 223, R4 225 and R5 227 are much larger than resistors R1 115 and R2 117 of FIG. 1, which reduces the power dissipation in these resistors R3 223, R4 225 and 227 in comparison with resistors R1 115 and R2 117 of FIG. 1.

In the embodiment illustrated in FIG. 2, the sink-source follower circuit has its output connected to the connection point 213 between the series stacked arrangement of series stacked capacitors C1 207 and C2 209. Either transistor Q1 219 or Q2 221 will turn on if the voltage at output of the sink-source follower at connection point 213 deviates by more than the upper or lower input reference voltage as defined by the resistor divider network R3 223, R4 225 and R5 227. In this way, the output of the sink-source follower at connection point 213 is maintained within the input reference voltage range defined by R3 223, R4 225 and R5 227. In the embodiment shown in FIG. 2, R5 227 offsets the input reference voltages at the control terminals or bases of the transistors Q1 219 and Q2 221 of the sink-source follower such that the base of transistor Q1 219 is slightly below one half the DC input to the series stacked capacitors and the base of transistor Q2 221 is slightly above one half the DC input to the series stacked capacitors. This is to ensure that both transistors will be off when series stacked capacitors are configured for doubler operation with switch SW1 211 closed. In another embodiment, not shown, the reference voltages defined by the choice of resistor R3 223, R4 225 and R5 227 are not centered at one half the DC input voltage to the series stacked capacitors but at some other fraction of the DC input voltage. Resistors R1 215 and R2 217 in FIG. 2 are chosen to have much lower resistance than R3 223, R4 225 and R5 227 and limit the power dissipation in the sink-source follower.

It is appreciated that although the embodiment illustrated in FIG. 2 uses a series stack of two capacitors, this circuit could apply to any number of series stacked capacitors where the connection point between each pair of capacitors in the series stack would be connected to the output of a separate sink-source follower circuit in accordance with the teachings of the present invention.

Therefore, the embodiment illustrated in FIG. 2 actively controls the voltages across series stacked capacitors C1 207 and C2 209 where either transistors Q1 219 or Q2 221 may be on depending on the polarity of capacitor leakage offset. This bleed current provided by the correcting transistor Q1 219 or Q2 221 will be substantially equal to the leakage current imbalance of capacitors C1 207 and C2 209 and therefore the minimum required to perform this function. As a result, dissipation of the balancing circuit is kept to a substantially minimal value.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A circuit, comprising:
   a first capacitor having first and second terminals;
   a second capacitor having first and second terminals, the first terminal of the second capacitor coupled to the second terminal of the first capacitor;
   a first transistor coupled across the first capacitor, the first transistor including a control terminal; and
   a second transistor coupled to the first transistor and across the second capacitor, the second transistor including a control terminal, wherein the control terminal of the second transistor is coupled to receive a first input reference and the control terminal of the first transistor is coupled to receive a second input reference, wherein the first input reference is greater than the second input reference.

2. The circuit of claim 1 wherein the first and second transistors are coupled to provide a bleed current to the first and second capacitors to balance a leakage current imbalance in the first and second capacitors.

3. The circuit of claim 2 wherein the bleed current is substantially equal to the leakage current imbalance in the first and second capacitors.

4. The circuit of claim 2 wherein the bleed current is substantially equal to zero when a voltage at the second terminal of the first capacitor and the first terminal of the second capacitor remains fixed at a voltage within an input reference range.

5. The circuit of claim 1 further comprising a resistor divider network coupled to the first and second transistors to generate at least the first input reference and the second input reference.

6. The circuit of claim 1 wherein the first and second transistors are coupled to the second terminal of the first capacitor and the first terminal of the second capacitor, the first and second transistors to maintain a voltage at the second terminal of the first capacitor and the first terminal of the second capacitor within an input reference range.

7. The circuit of claim 1 wherein the first and second transistors are coupled in a sink-source follower circuit configuration.

8. The circuit of claim 7 wherein the sink-source follower circuit is coupled to receive the first and second input references that are offset from a fraction of a voltage between the first terminal of the first capacitor and the second terminal of the second capacitor.

9. The circuit of claim 8 wherein the first and second input references define a range of voltages including upper and lower reference voltages, respectively, each of which is offset from the fraction of the voltage between the first terminal of the first capacitor and the second terminal of the second capacitor.

10. The circuit of claim 7 wherein the first and second transistors comprise bipolar junction transistors.

11. The circuit of claim 10 wherein the first and second transistors comprise a PNP transistor and an NPN transistor.

12. The circuit of claim 11 further comprising an impedance coupled to a collector of the first transistor to limit a bleed current through the first transistor.

13. The circuit of claim 12 wherein the impedance comprises a resistor.

14. The circuit of claim 11 further comprising an impedance coupled to a collector of the second transistor to limit a bleed current through the second transistor.

15. The circuit of claim 14 wherein the impedance comprises a resistor.

16. The circuit of claim 1 wherein the circuit is an active circuit included in a power supply circuit.

* * * * *